United States Patent [19]

Medawar

[11] Patent Number: 5,625,337
[45] Date of Patent: Apr. 29, 1997

[54] SUPPLEMENTARY VEHICLE WARNING SYSTEM

[76] Inventor: Phillip C. Medawar, 2921 Breton, SE., Grand Rapids, Mich. 49512-1745

[21] Appl. No.: 389,273

[22] Filed: Feb. 8, 1995

[51] Int. Cl.$^6$ ............................................. B60Q 1/00
[52] U.S. Cl. .................. 340/449; 340/438; 340/451; 340/455; 340/459; 340/461; 340/660; 340/460; 307/10.6; 307/10.7
[58] Field of Search ...................... 340/428, 438, 340/449, 450–450.3, 455, 660, 451, 459, 460, 461, 462; 307/10.6, 10.7

[56] References Cited

U.S. PATENT DOCUMENTS

| | | | |
|---|---|---|---|
| 3,873,963 | 3/1975 | Neal et al. | 340/902 |
| 4,015,237 | 3/1977 | Takatani et al. | 340/459 |
| 4,344,136 | 8/1982 | Panik | 340/459 |
| 4,348,653 | 9/1982 | Tsuzuki et al. | 340/460 |
| 4,383,241 | 5/1983 | Kojima et al. | 340/460 |
| 4,389,639 | 6/1983 | Torii et al. | 340/460 |
| 4,393,365 | 7/1983 | Kondo et al. | 340/460 |
| 4,401,971 | 8/1983 | Saito et al. | 340/460 |
| 4,438,422 | 3/1984 | Nojiri et al. | 340/460 |
| 4,785,280 | 11/1988 | Fubini et al. | 340/438 |
| 4,794,394 | 12/1988 | Halstead | 340/902 |
| 4,817,040 | 3/1989 | Bodley-Scott | 340/459 |
| 4,890,088 | 12/1989 | Woodell | 340/459 |
| 4,940,965 | 7/1990 | Umehara | 340/460 |
| 5,016,006 | 5/1991 | Umehara | 340/460 |
| 5,272,464 | 12/1993 | Jorgensen | 340/459 |
| 5,347,260 | 9/1994 | Ginzel et al. | 340/459 |

*Primary Examiner*—Jeffery Hofsass
*Assistant Examiner*—Daniel J. Wu
*Attorney, Agent, or Firm*—Price, Heneveld, Cooper, DeWitt & Litton

[57] ABSTRACT

A vehicle warning system for warning a vehicle operator of a dangerous condition resulting from an abnormal engine parameter for use in a vehicle having a sensor for measuring the engine parameter and a gauge connected to the sensor by a line. The vehicle warning system includes an input port, a connector for connecting the input port to the line connecting the sensor and the gauge, a voltage detector for detecting when a voltage level at the input port exceeds a threshold level, and an alarm generator for warning an operator of a dangerous condition when the voltage detector detects that the voltage level exceeds the threshold level.

19 Claims, 2 Drawing Sheets

SUPPLEMENTARY VEHICLE WARNING SYSTEM

BACKGROUND OF THE INVENTION

In general, the present invention relates to a vehicle warning system for warning a vehicle operator of a dangerous condition. More specifically, the present invention relates to a vehicle warning system for issuing primarily an audible voice warning when an engine parameter reaches an unsafe level. The present invention is particularly adapted for use in automobiles and airplanes.

A typical vehicle includes several gauges positioned in a dashboard for displaying certain engine operating parameters to the operator. Most commonly, these gauges display the fuel level, engine (water) temperature, oil pressure, and battery voltage. Although these gauges are generally accurate, they are too passive in warning the vehicle operator that an engine parameter has reached a dangerous level. Moreover, vehicle operators rarely monitor the displayed engine parameter levels closely enough to prevent engine damage or worse yet, engine failure. Thus, many vehicle operators have found themselves stranded on highways only because their vehicle failed to provide an adequate warning that an engine parameter reached a critical level.

In an effort to solve the above problem, vehicle warning systems have been developed that provide an audible warning when an engine parameter has reached a dangerous level. Examples of such systems are disclosed in U.S. Pat. No. 4,348,653 issued to Tsuzuki et al., U.S. Pat. No. 4,383,241 issued to Kojima et al., U.S. Pat. No. 4,393,365 issued to Kondo et al., U.S. Pat. No. 4,401,971 issued to Saito et al., U.S. Pat. No. 4,438,422 issued to Nojiri et al., and U.S. Pat. No. 4,940,965 issued to Umehara. These systems utilize the existing on-board computers of the vehicles, and thus, are designed to be integrated into the vehicle's digital warning system during manufacturing. Unfortunately, these systems have not gained wide acceptance from the major automobile manufacturers, nor were they designed to be retrofit into existing vehicle's analog warning systems and, therefore, are not available to consumers.

SUMMARY OF THE INVENTION

Accordingly, the present invention has been made to overcome the above problems of the conventional vehicle warning systems in that it may be retrofit into any existing vehicle and thereby serve as a supplemental vehicle warning system to whatever gauges are present in the vehicle. Another aspect of the present invention is that it does not require the use of an on-board computer and is designed to be low in cost. A further aspect of the present invention is that an installer may readily adjust an input sensor voltage so that the supplemental vehicle warning system of the present invention may be installed on any make or model vehicle. Yet another aspect of the present invention is that it may shut off a car radio while a warning message is delivered. Still another aspect of the present invention is that a visual alarm may be provided in addition to the audible alarm.

Additional features and advantages of the invention will be set forth in part in the description which follows and in part will be apparent from the description and drawings, or may be learned by practice of the invention.

To achieve these and other advantages, and in accordance with the purpose of the invention as embodied and broadly described herein, the vehicle warning system of this invention includes an input port, a connector for connecting the input port to a line connecting a sensor and a gauge in a vehicle, a voltage detector for detecting when a voltage level at the input port reaches (i.e. exceeds or falls below) a threshold level, and an alarm generator for alarming an operator of a dangerous condition when the voltage detector detects that the voltage level has reached the threshold level.

These and other features, objects, and benefits of the invention will be recognized by those who practice the invention and by those skilled in the art, from the specification, the claims, and the drawing figures.

BRIEF DESCRIPTION OF THE DRAWINGS

The accompanying drawings which are incorporated in, and constitute a part of, this Specification illustrate several embodiments of the invention and, together with the description, serve to explain the objects, advantages, and principles of the invention.

DETAILED DESCRIPTION OF THE PREFERRED EMBODIMENTS

Reference will now be made in detail to the present preferred embodiments of the invention, examples of which are illustrated in the accompanying drawings.

Figure 1:
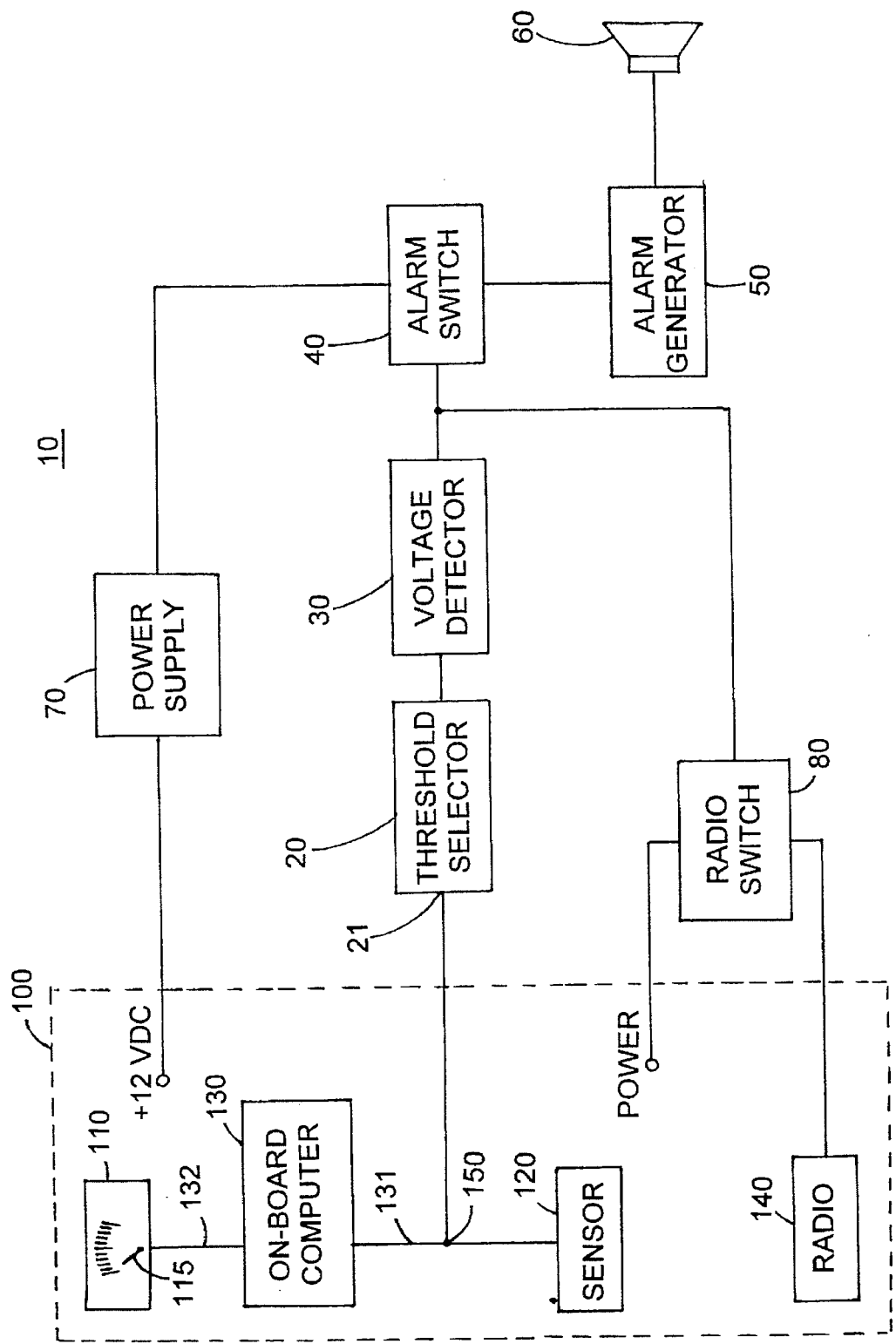
FIG. 1 is a block diagram of a vehicle warning system constructed according to a first embodiment of the present invention.

The exemplary embodiment of the vehicle warning system of the present invention is shown in FIG. 1 and is designated generally by the reference numeral 10. In general, vehicle warning system 10 includes threshold selector 20, a voltage detector 30, an alarm switch 40, an alarm generator 50, a speaker 60, a power supply 70, and a radio switch 80. Vehicle warning system 10 is designed to be easily connected to an existing vehicle 100 including at least one gauge 110, and at least one sensor 120. Most vehicles also include an on-board computer 130, which monitors the voltage output by sensor 120 and controls a display needle 115 in gauge 110 to display the detected engine parameter level. A first line 131 connects on-board computer 130 to sensor 120 and a second line 132 connects on-board computer to gauge 110. Further, most vehicles also include a radio 140 and an ignition providing 12 volts of DC power.

A connector 150 connects threshold selector 20 to first line 131, which extends between sensor 120 and on-board computer 130. Vehicle warning system 10 preferably permits an installer to adjust the voltage to be sensed by voltage detector 30 in order to deliver a warning message when the sensed engine parameter exceeds a level that is safe for the particular vehicle in which the system is installed. For this purpose, threshold selector 20 is provided to adjust the voltage received at an input port 21 thereof, prior to delivery to voltage detector 30.

When the voltage detected by voltage detector 30 reaches a predetermined limit, which is preferably the saturation limit of a transistor, voltage detector 30 causes alarm switch 40 to activate alarm generator 50 such that an audible alarm signal is delivered from speaker 60. Alarm switch 40 activates alarm generator 50 by connecting power supply 70 to alarm generator 50. Power supply 70 converts twelve volt DC power received from the vehicle's ignition to an appropriate DC voltage for energizing alarm generator 50. As will be discussed further below, alarm generator 50 is preferably a voice synthesizer integrated circuit. Thus, power supply 70 preferably converts 12 VDC to 5 VDC.

When the voltage detected by voltage detector 30 reaches the predetermined limit, voltage detector 30 may also cause radio switch 80, which is preferably a relay switch, to interrupt the power supplied to radio 140. In this manner, vehicle warning system 10 may turn off the vehicle's radio when delivering the audible alarm signal in order to ensure that the alarm is heard by the vehicle operator.

Figure 2:
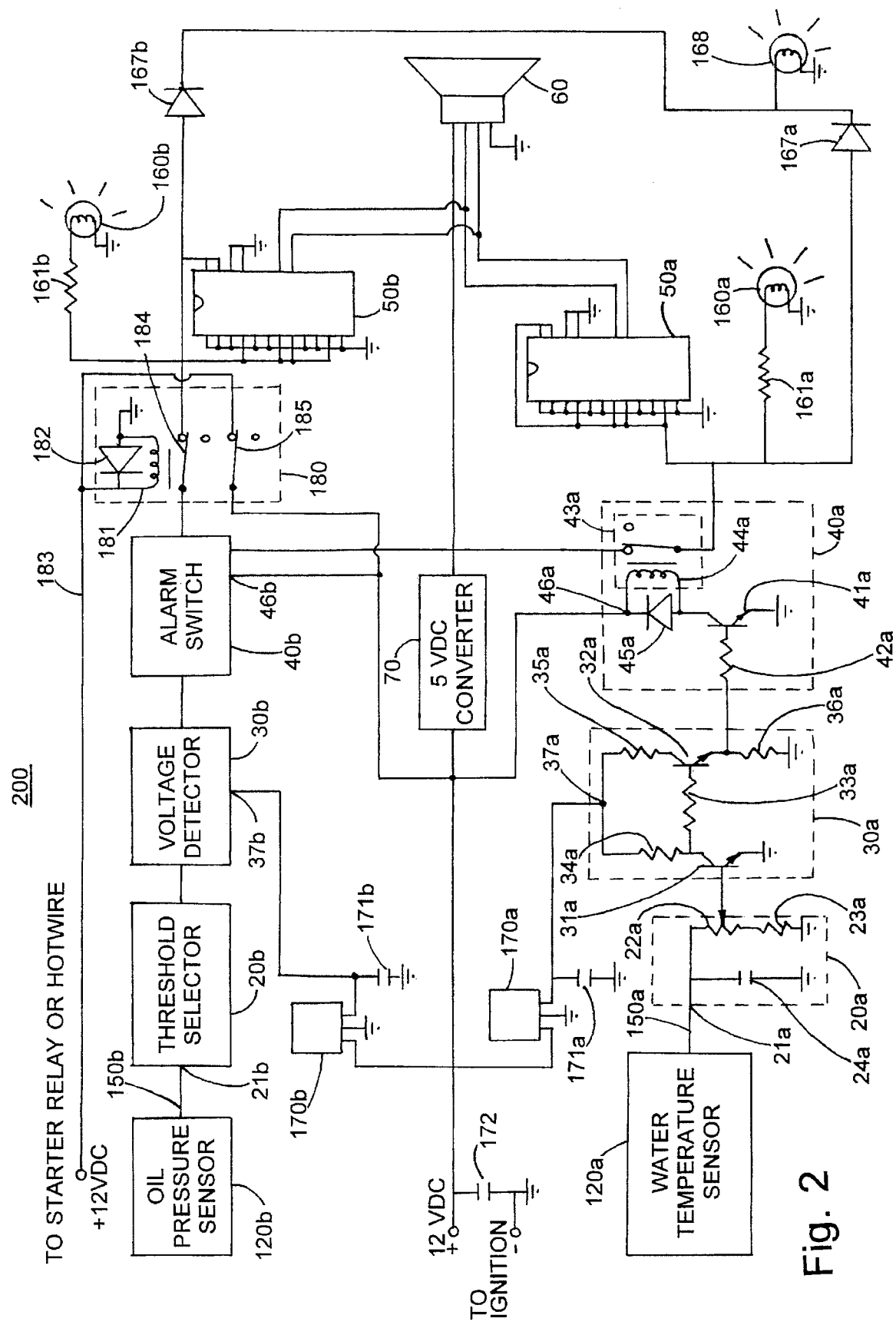
FIG. 2 is an electrical schematic of a vehicle warning system constructed according to a second embodiment of the present invention.

The preferred structures for threshold selector 20, voltage detector 30, alarm switch 40, and alarm generator 50 are shown in FIG. 2 and are discussed below as implemented in the second embodiment of the present invention.

The vehicle warning system constructed in accordance with the second embodiment of the present invention is shown in FIG. 2 and is designated generally with the reference numeral 200. Vehicle warning system 200 differs from the vehicle warning system (10) of the first embodiment in that two different engine parameters are monitored and warning light 168 is provided to present a visual warning signal as well as the audible warning signal produced by alarm generator 50. For purposes of example, vehicle warning system 200 will be described as monitoring water temperature and oil pressure although other or additional engine parameters may be monitored.

Vehicle warning system 200 monitors water temperature using an existing water temperature sensor 120a in the vehicle in which vehicle warning system 200 is installed. An output voltage from water temperature sensor 120a is received at input port 21a of threshold selector 20a via a connector 150a connected to the existing sensor output line that connects water temperature sensor 120a with a water temperature gauge or an on-board computer.

Threshold selector 20a preferably includes, a variable resistor 22a, a resistor 23a, and a capacitor 24a connected between input port 21a and ground. Variable resistor 22a and resistor 23a are connected in series between input port 21a and ground and in parallel with capacitor 24a. Preferably, capacitor 24a is a 0.0047 μF capacitor, resistor 23a is a 4.2 kΩ resistor, and variable resistor 22a is a 100 kΩ variable resistor. The output of threshold selector 20a is the variable output of variable resistor 22a. By varying the resistance in variable resistor 22a that is seen at the output, a person installing vehicle warning system 200 may adjust the output voltage level to be delivered to voltage detector 30a and thereby scale the sensor output voltage relative to a predetermined fixed reference voltage level to which the scaled sensor output voltage will be compared in voltage detector 30a.

Voltage detector 30a includes an input transistor 31a, an output transistor 32a, a first resistor 33a, a second resistor 34a, a third resistor 35a, and a fourth resistor 36a. Input transistor 31a is preferably a bipolar junction transistor (BJT) having a base connected to the output of threshold selector 20a, an emitter 34a connected to ground, and a collector connected a power terminal 37a via resistor 34a and to a base of output transistor 32a via resistor 33a. Output transistor 32a is preferably also an BJT transistor having a collector connected to power terminal 37a via resistor 35a and an emitter connected to an input of alarm switch 40a and to ground via resistor 36a. Preferably, resistors 33a and 36a are 20 kΩ resistors, resistor 34a is a 8.6 kΩ resistor, and resistor 35a is a 26 kΩ resistor.

Alarm switch 40a preferably includes a switch transistor 41a, a resistor 42a, a relay switch 43a having a relay coil 45a, and a diode 45a. Switch transistor 41a is preferably an BJT transistor having a collector, a base connected to the emitter of output transistor 32a of voltage detector 30a via resistor 42a, and an emitter connected to ground. Resistor 42a is preferably a 20 KΩ resistor. Relay coil 45a, and diode 45a are connected in parallel between the collector of switch transistor 41a and a power terminal 46a. When relay switch 43a is closed, 5 VDC is supplied from power supply 70, which is preferably a 5 VDC converter connected to the positive terminal of the vehicle's ignition, to alarm generator 50a, which is preferably a voice synthesizer integrated circuit. An example of a voice synthesizer integrated circuit useful in the present invention is the Archer ISD 1000A Voice Record/Playback IC available from Tandy Corporation. When energized, alarm generator 50a generates an alarm signal, which is preferably a voice message, and delivers the alarm signal to speaker 60. In addition to providing power to alarm generator 50a when relay switch 43a is closed, power supply 70 provides 5 VDC to testing light 160a via resistor 161a, which is preferably a 1.2 kΩ resistor. Testing light 160a is preferably a light emitting diode (LED). Also, when relay switch 43a is closed, power supply 70 provides 5 VDC through diode 167a to vehicle operator warning light 168, which may flash every five seconds. The use of warning light 168 is particularly suited for use by the hearing impaired, or for use in situations when loud noises muffle the audible system.

Vehicle warning system 200 preferably includes a voltage regulator 170a and a capacitor 171a, which is connected between an output of voltage regulator 170a and ground, for regulating the power received from the vehicle's ignition to 12 VDC to be supplied to power terminal 37a of voltage detector 30a. Preferably, capacitors 171a is a 1 μF capacitor.

Having described the preferred structure of the water temperature monitoring portion of vehicle warning system 200, the operation thereof is now explained. As the water temperature of the vehicle rises, the output voltage of water temperature sensor 120a falls. When the water temperature reaches a dangerous level, the output voltage of water temperature sensor 120a will fall to a threshold level at which it is desirable to produce a warning to the vehicle operator. This threshold voltage level is the voltage level present at input terminal 21a that causes input transistor 31a of voltage detector 30a to enter a nonconductive state. By adjusting variable resistor 22a, the threshold voltage level may be manually adjusted by the installer. When input transistor 31a enters a nonconductive state, output transistor 32a and switch transistor 41a enter conductive states. When switch transistor 41a enters a conductive state, current flows through relay coil 45a, causing relay switch 43a to close. When relay switch 43a is closed, power supply 70 supplies alarm generator 50a with power. Relay switch 43a is normally open whereby no power is supplied to alarm generator 50a. When alarm generator 50a is supplied with power, alarm generator 50a generates an alarm signal that is delivered to speaker 60. Preferably, alarm generator 50a generates a synthesized voice message stating something like, "ATTENTION! ATTENTION! YOUR ENGINE IS OVERHEATED! PULL OVER AND TURN OFF YOUR IGNITION IMMEDIATELY!" This message could be modified for other applications such as aerospace. Additionally, alarm generator 50a may generate a series of beeps to precede the voice message.

In addition, when relay switch 43a is closed, warning light 160a receives power from power supply 70 causing warning light 168 to flash every five seconds. Optionally, the vehicle's radio may be shut off when switch transistor 41a enters a conductive state such that the radio is turned off when a warning announcement is made.

Vehicle warning system 200 continues to make the warning announcement until the vehicle's ignition is turned off. If the vehicle is subsequently restarted before the water temperature falls to a safe level, alarm generator 50a will preferably continue to issue the warning announcement.

Having described the preferred structure of the water temperature monitoring portion of vehicle warning system 200, the oil pressure monitoring portion will now be described. It will be noted that elements of the oil pressure monitoring portion that are the same as the elements of water temperature monitoring portion are designated with the same reference numerals with the exception that the "a" is changed to a "b". The oil pressure monitoring portion of vehicle warning system 200 is substantially the same as the water temperature portion except that an additional relay switch 180 is provided to prevent alarm switch 40b from activating alarm generator 50b prior to ignition. Because the structure is otherwise the same, the description of the oil pressure monitoring portion will not include a description of the common elements, but will instead focus on relay switch 180 and its operation. Relay switch 180 includes a relay coil 181 and a diode 182 connected in parallel between ground and a wire 183 connected to either a starter relay or starter hot wire. Relay switch 180 further includes a first switch 184 for selectively connecting alarm switch 40b and alarm generator 50b, and a second switch 185 for selectively connecting the positive terminal of the ignition to wire 183.

As the oil pressure of the vehicle falls, the output voltage of oil pressure sensor 120b also falls. When the oil pressure falls to a dangerous level, the output voltage of oil pressure sensor 120b will fall to a threshold level at which it is desirable to produce a warning to the vehicle operator. This threshold voltage level is the voltage level present at input terminal 21b that causes the input transistor of voltage detector 30b to enter a nonconductive state. By adjusting the variable resistor of threshold selector 20b, the threshold voltage level may be manually adjusted by the installer or by the vehicle operator. When the threshold voltage level is reached at input port 21b, the relay switch in alarm switch 40b closes.

Because the normal oil pressure in a vehicle is initially very low prior to ignition, relay switch 180 is provided to prevent vehicle warning system 200 from falsely warning the vehicle operator that the oil pressure is dangerously low until the oil pressure has reached its operating pressure. Thus, first and second switches 184 and 185 of relay switch 180, which are normally open, close during ignition and remain closed until the ignition is turned off. When first switch 184 of relay switch 180 and the relay switch in alarm switch 40b are both closed, power supply 70 supplies alarm generator 50b and warning light 160b with power. The relay switch in alarm switch 40b is normally open whereby no power is supplied to alarm generator 50b. When alarm generator 50b is supplied with power, alarm generator 50b generates an alarm signal that is delivered to speaker 60. Preferably, alarm generator 50b generates a synthesized voice message stating something like, "ATTENTION! ATTENTION! YOUR OIL PRESSURE IS LOW! PULL OVER AND TURN OFF YOUR IGNITION IMMEDIATELY!" Again, this message could be modified for other applications such as aerospace. Additionally, alarm generator 50b may generate a series of beeps to precede the voice message.

As stated above, power supply 70 may receive power from the vehicle's ignition. In this respect, vehicle warning system 200 may include a capacitor 172, which is preferably a 0.0047 μF capacitor, connected between the positive and negative terminals of the ignition. Power supply 70, power terminal 46a of alarm switch 40a, and power terminal 46b of alarm switch 40b are directly connected to the positive terminal of the vehicle ignition.

Although the present invention has been described with respect to implementation in an automobile, the present invention may be implemented in any type of vehicle or other engine propelled apparatus including airplanes, boats, and heavy equipment.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The embodiments of the invention in which an exclusive property or privilege is claimed are defined as follows:

1. A vehicle warning system for warning a vehicle operator of a dangerous condition resulting from an abnormal engine parameter for use in a vehicle having a sensor for measuring the engine parameter, a computer connected to the sensor by a first line, and a gauge connected to the computer by a second line, for displaying the measured engine parameter, said system comprising:

a power supply;

an input port;

a connector for connecting said input port to the first line of the vehicle;

threshold selecting means for selecting a threshold level for the engine parameter at which an alarm is to be generated;

a voltage detector for detecting when a voltage level at said input port reaches the selected threshold level;

an alarm generator for generating an alarm to warn an operator of a dangerous condition when provided with power from said power supply;

a first switch having a control terminal connected to said threshold detecting means for controllably connecting and disconnecting said alarm generator to said power supply, wherein said first switch connects said alarm generator to said power supply when said voltage detector detects that the voltage level has reached the selected threshold level; and a second switch connected between said first switch and said alarm generator and having a control terminal connected to a starter of the vehicle such that said alarm generator is prevented from generating an alarm prior to vehicle ignition.

2. The vehicle warning system of claim 1, wherein the sensor of the vehicle is an oil pressure sensor and said alarm generator generates an audible alarm when the measured oil pressure falls below the selected threshold level.

3. The vehicle warning system of claim 1, wherein said power supply is a voltage regulator for converting twelve volts of DC power supplied by a battery of the vehicle to five volts of DC power.

4. The vehicle warning system of claim 1, wherein the sensor of the vehicle is a water temperature sensor and said alarm generator generates an audible alarm when the measured water temperature exceeds the selected threshold level.

5. The vehicle warning system of claim 1, wherein the sensor of the vehicle is an oil pressure sensor and said alarm generator generates an audible alarm when the measured oil pressure exceeds the selected threshold level.

6. The vehicle warning system of claim 1, wherein said threshold selecting means includes a variable resistor having a first terminal connected to said input port, and a second terminal connected to said voltage detector.

7. A vehicle warning system for warning a vehicle operator of a dangerous condition resulting from an abnormal engine parameter for use in a vehicle having a sensor for measuring the engine parameter, a computer connected to the sensor by a first line, and a gauge connected to the computer by a second line, for displaying the measured engine parameter, said system comprising:

a power supply;

an input port;

a connector for connecting said input port to the first line of the vehicle;

threshold selecting means for selecting a threshold level for the engine parameter at which an alarm is to be generated;

a voltage detector for detecting when a voltage level at said input port reaches the selected threshold level;

an alarm generator for generating an alarm to warn an operator of a dangerous condition when provided with power from said power supply;

a switch having a control terminal connected to said threshold detecting means for controllably connecting and disconnecting said alarm generator to said power supply, wherein said switch connects said alarm generator to said power supply when said voltage detector detects that the voltage level has reached the selected threshold level, wherein said threshold selecting means includes a variable resistor having a first terminal connected to said input port, and a second terminal connected to said voltage detector, wherein said voltage detector includes:

a first transistor having a base, a collector, and an emitter, said base being connected to said second terminal of said variable resistor, and said emitter being connected to ground; and a second transistor having a base, a collector, and an emitter, said base being connected to said collector of said first transistor, said collector being connected to a power terminal, and said emitter being connected to said switch, wherein said first transistor is nonconductive and said second transistor is conductive when a voltage at said second terminal of said variable resistor falls below a saturation voltage of said first transistor, and said switch connects the alarm generator to said power supply when said second transistor is conducting.

8. The vehicle warning system of claim 7, wherein said switch includes:

a switching transistor having a base, a collector, and an emitter, said base being connected to said emitter of said second transistor of said voltage detector, said emitter being connected to ground; and a relay switch having a relay switch contact and a relay coil connected to a power terminal at one end and said collector of said switching transistor at another end, wherein said switching transistor and said relay coil of said relay switch are in a conductive state when said second transistor of said voltage detector is conducting, and wherein said relay switch contact connects said alarm generator to said power supply when said relay coil is in a conductive state.

9. A vehicle warning system for warning a vehicle operator of dangerous conditions resulting from abnormal engine parameters for use in a vehicle having a first sensor for measuring water temperature, a second sensor for measuring oil pressure, a computer connected to the first sensor by a first line and connected to the second sensor by a second line, a water temperature gauge connected to the computer by a third line, and a oil pressure gauge connected to said computer by a fourth line, said system comprising:

a power supply;

a water temperature warning circuit including a water temperature input port, a first connector for connecting said water temperature input port to the first line of the vehicle, first threshold selecting means for selecting a first threshold level for the water temperature at which an alarm is to be generated, a first voltage detector for detecting when a voltage level, which represents the water temperature, at said water temperature input port falls below the selected first threshold level, a first alarm generator for generating an alarm to warn an operator of a dangerous condition when provided with power from said power supply, and a first switch having a control terminal connected to said first voltage detector for controllably connecting and disconnecting said first alarm generator to said power supply, wherein said first switch connects said first alarm generator to said power supply when said first voltage detector detects that the first voltage level has fallen below the selected first threshold level; and an oil pressure warning circuit including an oil pressure input port, a second connector for connecting said oil pressure input port to the second line of the vehicle, second threshold selecting means for selecting a second threshold level for the oil pressure at which an alarm is to be generated, a second voltage detector for detecting when a second voltage level at said oil pressure input port falls below the selected second threshold level, a second alarm generator for generating an alarm to warn an operator of a dangerous condition when provided with power from said power supply, a second switch having a control terminal connected to said second voltage detector for controllably connecting and disconnecting said second alarm generator to said power supply, wherein said second switch connects said second alarm generator to said power supply when said second voltage detector detects that the second voltage level has fallen below the selected second threshold level, a third switch connected between said second switch and said second alarm generator and having a control terminal activated by a starter of the vehicle and connected to an ignition of the vehicle such that said second alarm generator is prevented from generating an alarm prior to vehicle ignition.

10. The vehicle warning system of claim 9, wherein said power supply is a voltage regulator for converting twelve volts of DC power supplied by a battery of the vehicle to five volts of DC power.

11. The vehicle warning system of claim 9, wherein said first threshold selecting means includes a variable resistor having a first terminal connected to said water temperature input port, and a second terminal connected to said first voltage detector, and wherein said second threshold selecting means includes a variable resistor having a first terminal connected to said oil pressure input port, and a second terminal connected to said second voltage detector.

12. The vehicle warning system of claim 9, further including:

a visual alarm connected to said first and second switches such that said visual alarm is activated when (1) said first voltage detector detects that the first voltage level has fallen below the selected first threshold level or (2) said second voltage detector detects that the second voltage level exceeds the selected second threshold level, wherein said first and second alarm generators generate audible alarms.

13. A vehicle warning system for warning a vehicle operator of a dangerous condition resulting from an abnormal engine parameter for use in a vehicle having a sensor for measuring the engine parameter and a gauge, connected to the sensor by a line, for displaying the measured engine parameter, said system comprising:

an input port;

a connector for connecting said input port to the line connecting the sensor and the gauge;

voltage detecting means for detecting when a voltage level at said input port reaches a threshold level;

alarm generating means for alarming an operator of a dangerous condition when said voltage detecting means detects that the voltage level has reached the threshold level; and a switch connected to said alarm generator and having a control terminal connected to a starter of the vehicle such that said alarm generator is prevented from generating an alarm prior to vehicle ignition.

14. The vehicle warning system of claim 13, wherein said alarm generating means generates an audible alarm.

15. The vehicle warning system of claim 13, further including:

a flashing visual alarm that is activated when said voltage detecting means detects that the voltage level has reached the selected threshold level.

16. The vehicle warning system of claim 13, wherein the sensor of the vehicle is a water temperature sensor and said alarm generating means generates an audible alarm when the measured water temperature exceeds the selected threshold level.

17. The vehicle warning system of claim 13, wherein the sensor of the vehicle is an oil pressure sensor and said alarm generating means generates an audible alarm when the measured oil pressure exceeds the selected threshold level.

18. The vehicle warning system of claim 13, further including a visual alarm connected to said switch such that said visual alarm is activated when said voltage detecting means detects that the voltage level has reached the selected threshold level.

19. The vehicle warning system of claim 13, wherein said alarm generating means includes a voice synthesizer integrated circuit and a speaker connected to said voice synthesizer integrated circuit.

* * * * *